(12) United States Patent
Li et al.

(10) Patent No.: US 9,961,102 B2
(45) Date of Patent: May 1, 2018

(54) DETECTION OF STACK PIVOTING

(71) Applicant: McAfee, LLC, Plano, TX (US)

(72) Inventors: Xiaoning Li, Hillsboro, OR (US); Lixin Lu, San Jose, CA (US); Lu Deng, Santa Clara, CA (US)

(73) Assignee: McAfee, LLC, Plano, TX (US)

( * ) Notice: Subject to any disclaimer, the term of this patent is extended or adjusted under 35 U.S.C. 154(b) by 6 days.

(21) Appl. No.: 14/495,108

(22) Filed: Sep. 24, 2014

(65) Prior Publication Data

US 2016/0021134 A1    Jan. 21, 2016

Related U.S. Application Data

(60) Provisional application No. 62/025,484, filed on Jul. 16, 2014.

(51) Int. Cl.
*H04L 29/06* (2006.01)

(52) U.S. Cl.
CPC ............................... *H04L 63/1441* (2013.01)

(58) Field of Classification Search
CPC .................................................. H04L 63/1441
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,412,071 B1* | 6/2002 | Hollander | G06F 9/4425 |
| | | | 711/E12.101 |
| 6,460,050 B1 | 10/2002 | Pace et al. | |
| 7,506,155 B1 | 3/2009 | Stewart et al. | |
| 8,555,385 B1* | 10/2013 | Bhatkar | G06F 21/556 |
| | | | 726/22 |
| 9,594,912 B1* | 3/2017 | Thioux | G06F 21/577 |
| 2008/0244695 A1* | 10/2008 | Lee | G06F 21/608 |
| | | | 726/1 |
| 2012/0117355 A1* | 5/2012 | Campbell | G06F 12/1009 |
| | | | 711/206 |
| 2012/0167120 A1* | 6/2012 | Hentunen | G06F 21/54 |
| | | | 719/320 |

(Continued)

FOREIGN PATENT DOCUMENTS

WO   WO 2013-040598 A1   3/2013
WO   WO 2016/010709 A1   1/2016

OTHER PUBLICATIONS

International Search Report and Written Opinion in International Application No. PCT/US2015/037778, dated Sep. 10, 2015, 12 pages.

(Continued)

*Primary Examiner* — Mary Li
(74) *Attorney, Agent, or Firm* — Patent Capital Group

(57) ABSTRACT

Particular embodiments described herein provide for an electronic device that can be configured to receive a function call for a function, determine a current stack pointer value for the function call, and determine if the current stack pointer value is within a pre-defined range. The electronic device can include a stack pivoting logging module to log a plurality of function calls. The electronic device can also include a stack pivoting detection module to analyze the log of the plurality of function calls to determine, for each of the plurality of function calls, if the current stack pointer value is within a pre-defined range.

18 Claims, 7 Drawing Sheets

(56) References Cited

U.S. PATENT DOCUMENTS

| | | |
|---|---|---|
| 2013/0304869 A1 | 11/2013 | Gupta et al. |
| 2014/0020092 A1 | 1/2014 | Davidov |
| 2014/0075556 A1 | 3/2014 | Wicherski |
| 2014/0123286 A1* | 5/2014 | Fischer ................ G06F 21/566 726/23 |
| 2015/0020198 A1* | 1/2015 | Mirski ................ G06F 21/566 726/23 |

OTHER PUBLICATIONS

Piotr Bania, "Security Mitigations for Return-Oriented Programming Attacks," Oct. 26, 2012, https://web.archive.org/web/20121026195744/http://kryptoslogic.com/securityresearch.html, 8 pages.

EPO dated Feb. 16, 2018 European Search Report and Opinion from European Application No. 15822361.0; 8 pages.

* cited by examiner

```
                   54
                ⌒‾‾‾⌒
                  52
              ⌒‾‾‾‾‾‾‾⌒
    50          56        58
     \          /         /
23085 (130000, 119000, 12DE90) lstrcpyA:23813775 ("","applyXSL")
23086 (130000, 119000, 12DE90) lstrcpyA:23813775 ("SOHQSOH0x$ETBy)
23087 (130000, 119000, 12DE90) lstrcpyA:23813775 ("SOHQSOHD|$ETBg)
23088 (130000, 119000, 12DE90) lstrcpyA:23813775 ("SOHQSOHx}$ETBl)
23089 (130000, 119000, 12DEAC) lstrcpyA:23813775 ("SOHQSOH ~ RS.ETB)
60⏤23090 (130000, 119000, 12DE7C) lstrcpyA:23813775 ("~SOHQSOHHx$ETBB)
62⤴ 23091 (130000, 119000, 1184DC04) LoadLibraryA : 20D192AE ("MSVCR100.
23092 (130000, 119000, 1184DC34) GetProcAddress : 20D192AE (41A30000
23093 (130000, 119000, 1184DC84) LoadLibraryA : 20D192AE ("CRYPT32.d
23094 (130000, 119000, 1184DCB4) GetProcAddress :20D192AE (77A80000
23095 (130000, 119000, 1184DDF0) LoadLibraryA : 20D192AE ("ntdll")
23096 (130000, 119000, 1184DE20) GetProcAddress : 20D192AE (7C900000
23097 (130000, 119000, 1184DE54) LoadLibraryA : 20D192AE (41A30000
23098 (130000, 119000, 1184DE84) GetProcAddress : 20D192AE ("MSVCR100.
23099 (130000, 119000, 1184DEB8) LoadLibraryA : 20D192AE ("Kernel32.
23100 (130000, 119000, 1184DEE8) GetProcAddress : 20D192AE (7C7F0000
23101 (130000, 119000, 1184DEF8) GetTempPathA : 20801049 ()
23102 (130000, 119000, 1184D080) NtCreateFile : 41258D (0,,"\??\C:\D
23103 (130000, 119000, 1184D02C) InterlockedCompareExchange : 411F4B
23104 (130000, 119000, 1184D030) SignalObjectAndWait : 412312 ()
23105 (130000, 119000, 1184C07C) NtSetInformationFile : 41A395 ()
23106 (130000, 119000, 1184DE1C) CreateFileA : 41AB7359 ("C:\DOCUMENT~
23107 (130000, 119000, 1184DE34) GetFileType : 41AB73D9 ()
```

FIG. 3

DETECTION OF STACK PIVOTING

CROSS-REFERENCE TO RELATED APPLICATION

This application claims the benefit of priority under 35 U.S.C. § 119(e) to U.S. Provisional Application Ser. No. 62/025,484, entitled "DETECTION OF STACK EXPLOITATION" filed Jul. 16, 2014 which is hereby incorporated by reference in its entirety.

TECHNICAL FIELD

This disclosure relates in general to the field of information security, and more particularly, to the detection of stack pivoting.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified diagram illustrating example details of a portion of a communication system for the detection of stack pivoting in accordance with an embodiment of the present disclosure;

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
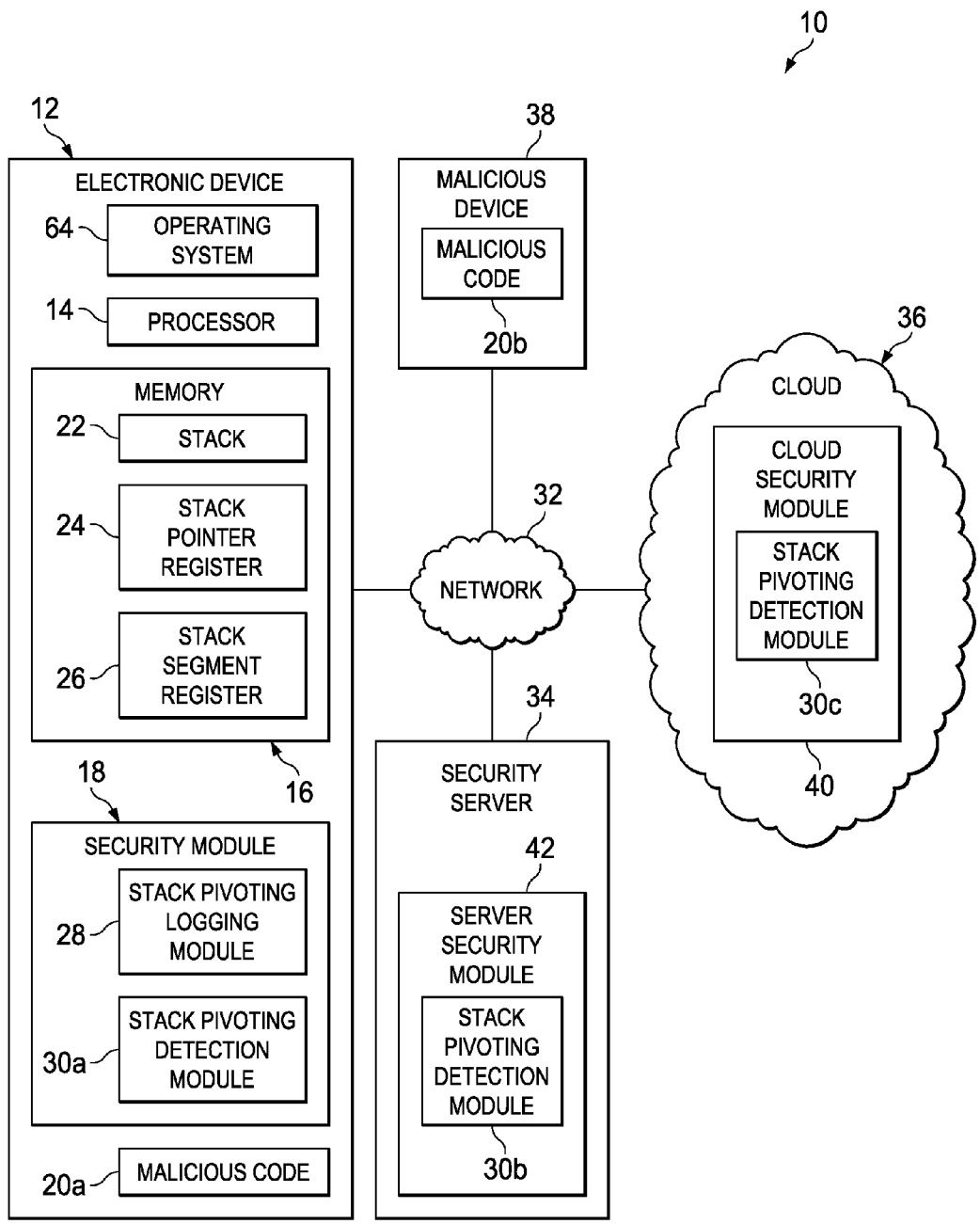
FIG. 1 is a simplified block diagram of a communication system for the detection of stack pivoting in accordance with an embodiment of the present disclosure.

FIG. 1 is a simplified block diagram of a communication system for the detection of stack pivoting in accordance with an embodiment of the present disclosure. Communication system 10 can include an electronic device 12, a security server 34, and a cloud 36. Electronic device 12 can include a processor 14, memory 16, a security module 18, and an operating system 64. Memory 16 can include a stack 22, a stack pointer register 24, and a stack segment register 26. Security module 18 can include a stack pivoting logging module 28 and a stack pivoting detection module 30a. In an embodiment, electronic device 12 can include malicious code 20a.

Security server 34 can include a server security module 42. Sever security module 42 can include stack pivoting detection module 30b. Cloud 36 can include a cloud security module 40. Cloud security module 40 can include stack pivoting detection module 30c. Malicious device 38 can include malicious code 20b. Malicious device 38 may attempt to introduce malware (e.g., malicious code 20b) to electronic device 12. Electronic device 12, security server 34, cloud 36, and malicious device 38 can be connected through network 32. In one example, malicious device 38 may be connected directly to electronic device 12 (e.g., through a USB type connection). Malicious device 38 may be any device that attempts to introduce malicious code (e.g., malicious code 20a or 20b) to electronic device 12.

In example embodiments, communication system 10 can be configured to include a system where API hooks are used for logging most system APIs' calls to observe and capture malware behavior. This allows for post analysis with comprehensive behavior logs. In an embodiment, the system can add stack locality to the information captured at the API monitor and hook points to catch stack pivoting behavior. Detailed logs tracing of the stack pointer behavior while the program executes and post analysis of the stack pivoting logs allows the system to detect/discover malicious return orientated programming (ROP) sequences including a stack pivoting gadget control flow and identify new zero-day advanced persistent threats (APTs).

Elements of FIG. 1 may be coupled to one another through one or more interfaces employing any suitable connections (wired or wireless), which provide viable pathways for network (e.g., network 32) communications. Additionally, any one or more of these elements of FIG. 1 may be combined or removed from the architecture based on particular configuration needs. Communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

For purposes of illustrating certain example techniques of communication system 10, it is important to understand the communications that may be traversing the network environment. The following foundational information may be viewed as a basis from which the present disclosure may be properly explained. ROP attacks need customized return target addresses in stack data to be delivered. With modern system defense mechanisms for stack buffer overflow, it is often difficult to create customized stack data in the original stack. Stack pivoting is currently a popular approach used by APT zero-day exploits. Stack pivoting techniques can be used to prepare customized data in heap, then, with instruction, to force the stack pointer to point to the heap address. Some current solutions are designed to discover APTs with evidences from compromised systems. Discovering the ROP attack path is important to provide further characterization and evidence for APTs. In an endpoint solution, different approaches may be used to detect stack pivoting including API hook based branch detection with binary translation. Because of the performance penalty, current endpoint solutions can only provide limited API hooks to detect stack pivoting, which can make bypassing easy for malicious software. For example, memcpy like APIs can be used to copy customized stack data into the real stack before calling to APIs. Thus, it is difficult for endpoint solutions to hook all kinds of APIs yet still provide good performance for the end user. On the other hand broad API hooks are acceptable for virtual appliances to discover malware behavior with the tradeoff of a performance penalty as automated analysis of the system can take a significant amount of system resources. Many existing end point solutions need to stop stack pivoting exploits with critical API hooks, but the APIs scope is limited due to performance issues. Additionally, existing end point solutions do not monitor for stack-pivot in an efficient manner. Further, many existing solutions focus on blocking stack pivoting, which cannot collect the full behavior of the exploit/malware payload (for example to recover the whole ROP attack chain which follows the stack pivot).

A communication system for the detection of stack pivoting, as outlined in FIG. 1, can resolve these issues (and others). In communication system 10 of FIG. 1, to detect stack pivoting, the system may be configured to include a system where API hooks are used for logging most system APIs' calls to observe and capture malware behavior allowing for post analysis with comprehensive behavior logs. In an embodiment, the system can add stack locality to the information captured at the API monitor and hook points to catch stack pivoting behavior. Such detailed logs tracing the stack pointer behavior while the program executes and post analysis of the stack pivoting logs allows the system to detect/discover the ROP sequence, including the stack pivoting gadget control flow and therefore identify new zero-day APTs.

In an example, a logging component (e.g., stack pivoting logging module 28) can log the status of a stack. The log can be sent to cloud security module 40 or server security module 42 for analysis where the log can be analyzed to identify the stack pivoting behaviors and recover an attack chain if malware is detected. In another example, the log may be sent to an offline virtual appliance tool that can analyze the log to identify the stack pivoting behaviors and recover an attack chain if malware is detected. This can allow for offline detection and recovery of an attack chain Turning to the infrastructure of FIG. 1, communication system 10 in accordance with an example embodiment is shown. Generally, communication system 10 can be implemented in any type or topology of networks. Network 32 represents a series of points or nodes of interconnected communication paths for receiving and transmitting packets of information that propagate through communication system 10. Network 32 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 10, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 10. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 12 and security server 34 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 10, each of electronic device 12 and security server 34 can include memory elements for storing information to be used in the operations outlined herein. Each of electronic device 12 and security server 34 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 10 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 10, such as electronic device 12, security server 34, and cloud 36 may include software modules (e.g., stack pivoting detection modules 30*a*, 30*b*, and 30*c*) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 12, security server 34, and cloud 36 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Figure 2:
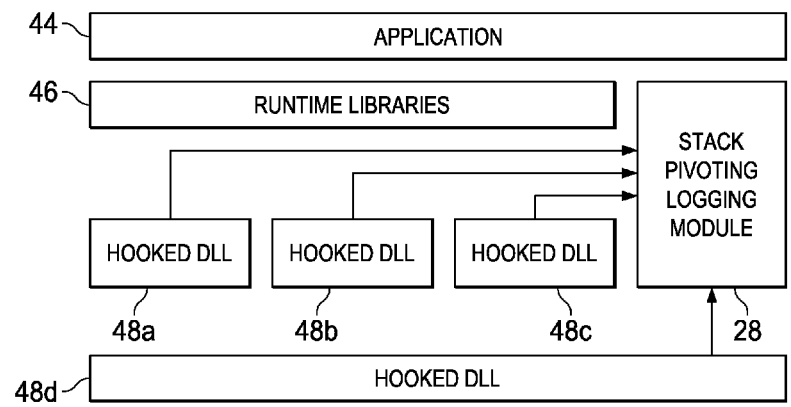
FIG. 2 is a simplified block diagram of a portion of a communication system for the detection of stack pivoting in accordance with an embodiment of the present disclosure.

Electronic device 12 can be a network element and includes, for example, desktop computers, laptop computers, mobile devices, personal digital assistants, smartphones, tablets, or other similar devices. Security server 34 can be a network element such as a server or virtual server and can be associated with clients, customers, endpoints, or end users wishing to initiate a communication in communication system 10 via some network (e.g., network 32). The term 'server' is inclusive of devices used to serve the requests of clients and/or perform some computational task on behalf of clients within communication system 10. Although stack pivoting detection modules 30*a*. 30*b*, and 30*c* are respectively represented in FIG. 1 as being located in electronic device 12, security server 34, and cloud 36 this is for illustrative purposes only. Stack pivoting detection modules 30*a*, 30*b*, and 30*c* could be combined or separated in any suitable configuration. Furthermore, stack pivoting detection modules 30*a*, 30*b*, and 30*c* could be integrated with or distributed in another network accessible by electronic device 12, security server 34, or cloud 36. Cloud 36 is configured to provide cloud services to electronic device 12. Cloud services may generally be defined as the use of computing resources that are delivered as a service over a network, such as the Internet. Typically, compute, storage, and network resources are offered in a cloud infrastructure, effectively shifting the workload from a local network to the cloud network Turning to FIG. 2, FIG. 2 is a simplified block diagram of a portion of a communication system for the detection of stack pivoting in accordance with an embodiment of the present disclosure. FIG. 2 illustrates run time basic building blocks including hooked dynamic link libraries (DLLs) and includes stack pivoting logging module 28, an application 44, runtime libraries 46, and hooked DLLs 48*a*-*d*. In an example, application 44 is a target vulnerable application or an application vulnerable to malware. Hooked DLL 48*a* can be a hooked kerne132.DLL, hooked DLL 48*b* can be a hooked user 32.DLL, hooked DLL 48*c* can be a hooked advapi32.dll, and hooked DLL 48*d* and be a hooked NTDLL.DLL or a file that includes NT kernel functions.

During a malware attack, a stack pivoting based ROP exploit needs to call APIs to deliver some functions. For example, a CVE-2013-0640 zero-day attack may use ROP to call APIs like LoadLibraryA, GetTempPathA, Fwrite, Wb, CryptStringToBinaryA, RtlDecompressBuffer, Wcsstr, etc. When the hooked APIs are called, virtual appliance hooks can call into common stack pivoting logging functions to log the original current thread stack range and the current value in the ESP register (e.g. stack pointer register 24). The original range could be read from a current thread information block in the OS, and the ESP register, or can be read with assembly code directly. After the calls have been logged by stack pivoting logging module 28, stack pivoting detection module 30*a* can detect stack pivoting by comparing the valid stack range with instruction ESP register values for API calls, which can identify the whole ROP attack chain.

Turning to FIG. 3, FIG. 3 FIG. 3 is a simplified diagram of a portion of a communication system for the detection of stack pivoting in accordance with an embodiment of the present disclosure. FIG. 3 illustrates a specific example of a captured log for a CVE-2013-0640 zero-day exploit log. The capture log can include a line number column 50, address columns 52, and call column 58. Address columns 52 can include stack bound column 54 and ESP register value column 56. Reference number 60 references line 23090 which includes a stack bound of 130000 to 119000 in stack bound column 54. ESP register value column 56 indicates that 12DE7C is the value in the ESP register, which is within the stack bound. However, reference number 62 references line 23091 which includes a stack bound of 130000 to 119000 in stack bound column 54 and ESP register value column 56 indicates that 1184DC04 is the value in the ESP register. This value is outside the stack bound and indicates that stack pivoting happened during calling into Load Library AAPI, illustrated in call column 58. Log processing can be used to determine that a stack pivoting based exploit happened during run time analysis for this zero-day exploit. The capture log can be used to rebuild the exploit path and analyze the malware.

Figure 4:
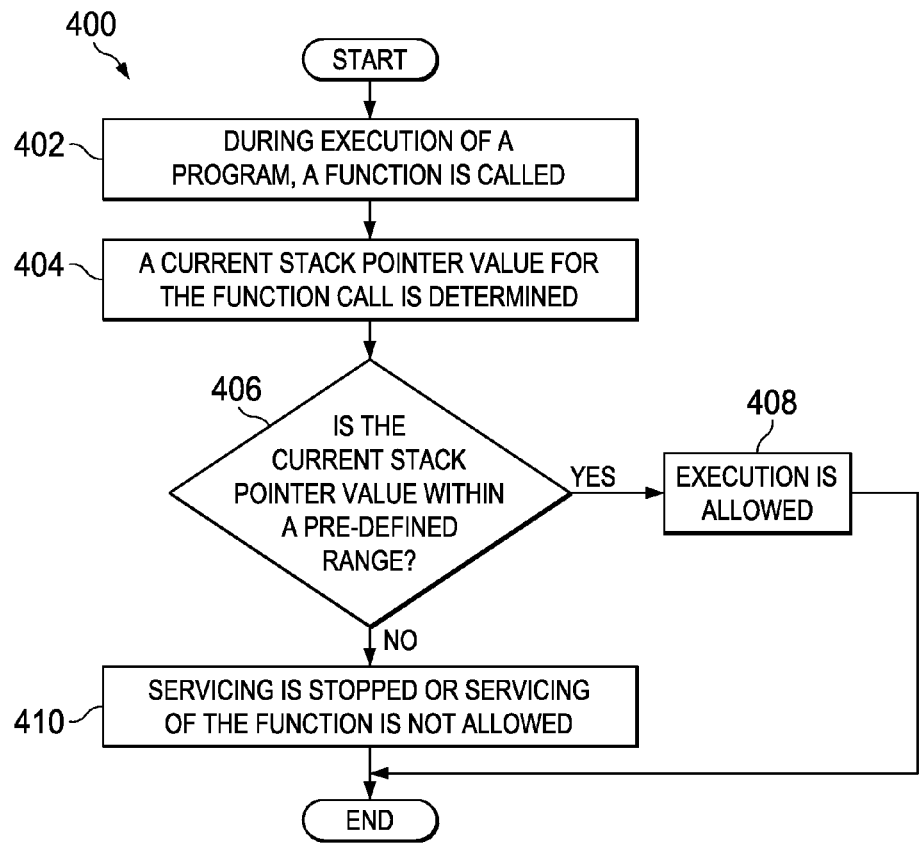
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with the detection of stack pivoting, in accordance with an embodiment. In an embodiment, one or more operations of flow 400 may be performed by security module 18, security server module 42, or cloud security module 40. At 402, during execution of a program, a function is called. At 404, a current stack pointer value for the function call is determined. For example, this could be the value in stack pointer register 24. At 406, the system determines if the current stack pointer value is within a pre-defined range. For example, stack pivoting detection module 30a may determine if the value in stack pointer register 24 (e.g., the value from ESP register value column 56 in FIG. 3) is within a pre-defined range (e.g., the range in stack bound column 54 in FIG. 3). If the current stack pointer value is within a pre-defined range, the execution of the function is allowed, as in 408. If the current stack pointer value is not within a pre-defined range, then servicing of the function is stopped or servicing of the function is not allowed, as in 410. In an example, after malware is detected, then the log may be analyzed to rebuild the exploit path and analyze the malware. Post analysis can take place after the real attack happened and in such instance, when the current stack pointer value is not within a pre-defined range, then it is apparent that an attack occurred. Because it is post analysis of the attack, the servicing of the function cannot be stopped or not allowed. This process can be used to help discover stack pivoting and post analysis can help virtual appliance system to identify exploit/malware.

Figure 5:
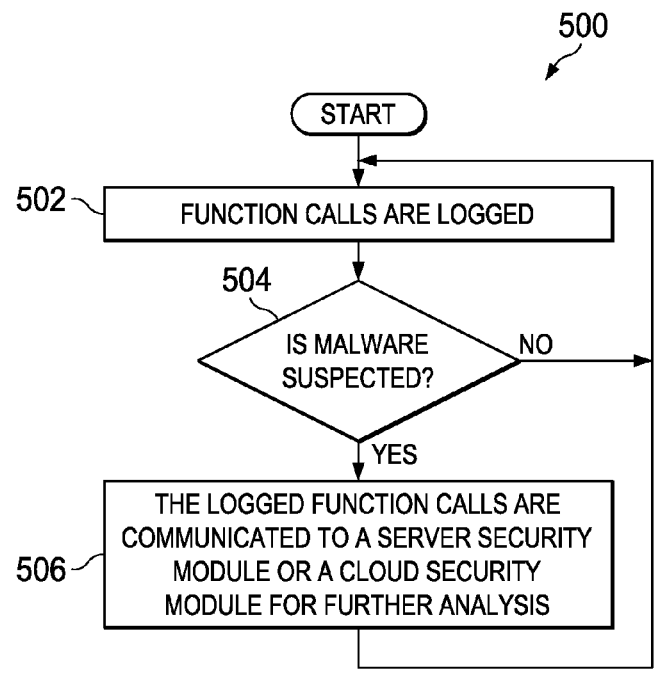
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with the detection of stack pivoting, in accordance with an embodiment. In an embodiment, one or more operations of flow 500 may be performed by security module 18, security server module 42, or cloud security module 40. At 502, function calls are logged. For example, the function calls may be logged by stack pivoting logging module 28 in security module 18. At 504, the system determines if malware is suspected. For example, stack pivoting detection module 30 in security module 18 may analyze the logged function calls to determine if malware is suspected. If malware is not suspected, then the system returns to 502 where function calls are logged. If malware is suspected, then the logged function calls are communicated to a server security module or a cloud security module for further analysis. For example, when malware is suspected, security module 18 may communicate with server security module 42 in security server 34 and stack pivoting detection module 30b in security server 34 can analyze the logged functions, rebuild the exploit path, and analyze the malware. In another example, security module 18 may communicate with cloud security module 40 in cloud 36 and stack pivoting detection module 30c in cloud 36 can analyze the logged functions, rebuild the exploit path, and analyze the malware.

Figure 6:
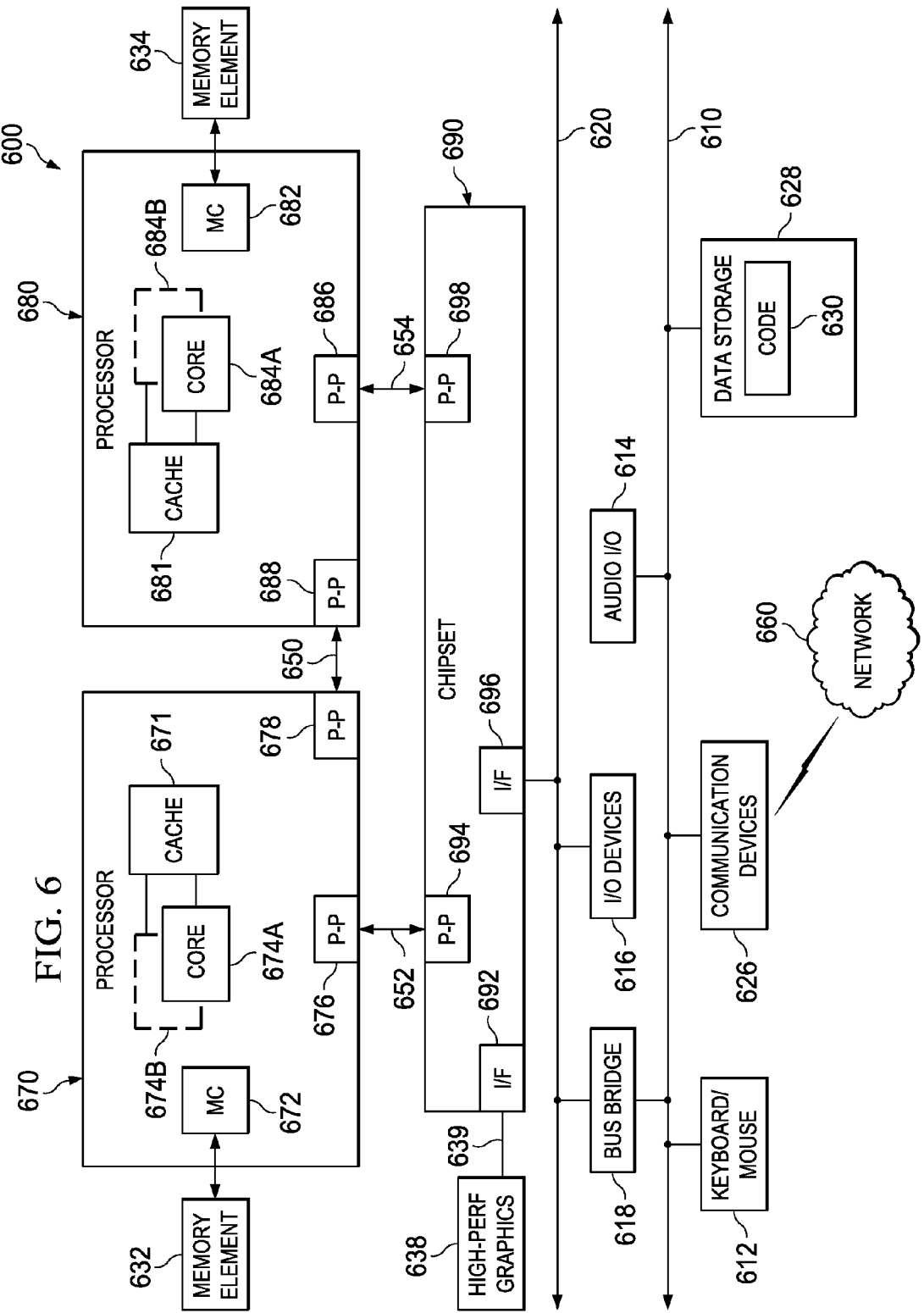
FIG. 6 is a block diagram illustrating an example computing system that is arranged in a point-to-point configuration in accordance with an embodiment.

FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces. Generally, one or more of the network elements of communication system 10 may be configured in the same or similar manner as computing system 600.

As illustrated in FIG. 6, system 600 may include several processors, of which only two, processors 670 and 680, are shown for clarity. While two processors 670 and 680 are shown, it is to be understood that an embodiment of system 600 may also include only one such processor. Processors 670 and 680 may each include a set of cores (i.e., processor cores 674A and 674B and processor cores 684A and 684B) to execute multiple threads of a program. The cores may be configured to execute instruction code in a manner similar to that discussed above with reference to FIGS. 1-5. Each processor 670, 680 may include at least one shared cache 671, 681. Shared caches 671, 681 may store data (e.g., instructions) that are utilized by one or more components of processors 670, 680, such as processor cores 674 and 684.

Processors 670 and 680 may also each include integrated memory controller logic (MC) 672 and 682 to communicate with memory elements 632 and 634. Memory elements 632 and/or 634 may store various data used by processors 670 and 680. In alternative embodiments, memory controller logic 672 and 682 may be discrete logic separate from processors 670 and 680.

Processors 670 and 680 may be any type of processor and may exchange data via a point-to-point (PtP) interface 650 using point-to-point interface circuits 678 and 688, respectively. Processors 670 and 680 may each exchange data with a chipset 690 via individual point-to-point interfaces 652 and 654 using point-to-point interface circuits 676, 686, 694, and 698. Chipset 690 may also exchange data with a high-performance graphics circuit 638 via a high-performance graphics interface 639, using an interface circuit 692, which could be a PtP interface circuit. In alternative embodiments, any or all of the PtP links illustrated in FIG. 6 could be implemented as a multi-drop bus rather than a PtP link.

Chipset 690 may be in communication with a bus 620 via an interface circuit 696. Bus 620 may have one or more devices that communicate over it, such as a bus bridge 618 and I/O devices 616. Via a bus 610, bus bridge 618 may be in communication with other devices such as a keyboard/mouse 612 (or other input devices such as a touch screen, trackball, etc.), communication devices 626 (such as modems, network interface devices, or other types of communication devices that may communicate through a computer network 660), audio I/O devices 614, and/or a data storage device 628. Data storage device 628 may store code 630, which may be executed by processors 670 and/or 680. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 7:
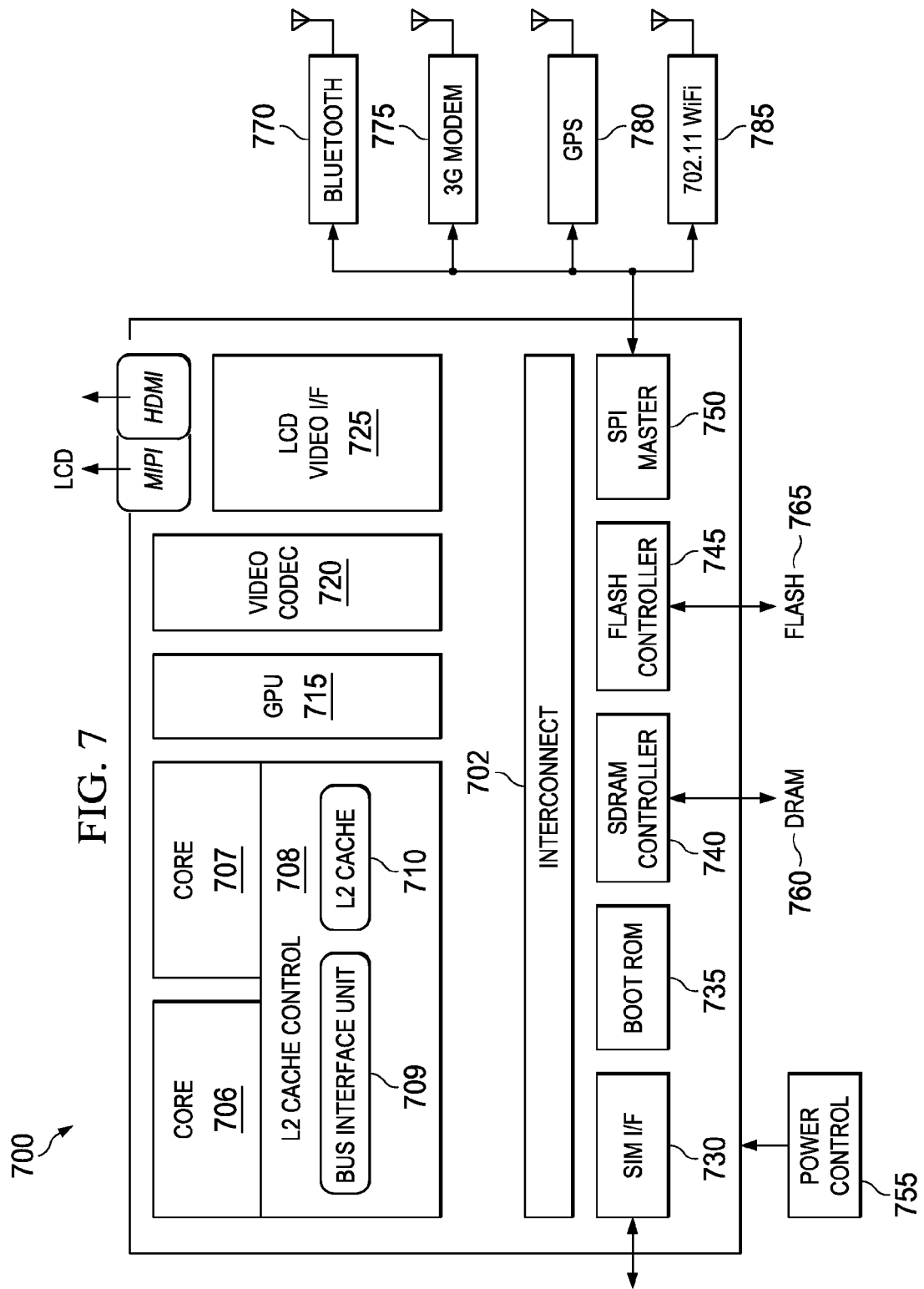
FIG. 7 is a simplified block diagram associated with an example ARM ecosystem system on chip (SOC) of the present disclosure.

Turning to FIG. 7, FIG. 7 is a simplified block diagram associated with an example ARM ecosystem SOC 700 of the present disclosure. At least one example implementation of the present disclosure can include the detection of stack pivoting features discussed herein and an ARM component. For example, the example of FIG. 7 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 7, ARM ecosystem SOC 700 may include multiple cores 706-707, an L2 cache control 708, a bus interface unit 709, an L2 cache 710, a graphics processing unit (GPU) 715, an interconnect 702, a video codec 720, and a liquid crystal display (LCD) I/F 725, which may be associated with mobile industry processor interface (MIPI)/high-definition multimedia interface (HDMI) links that couple to an LCD.

ARM ecosystem SOC 700 may also include a subscriber identity module (SIM) I/F 730, a boot read-only memory (ROM) 735, a synchronous dynamic random access memory (SDRAM) controller 740, a flash controller 745, a serial peripheral interface (SPI) master 750, a suitable power control 755, a dynamic RAM (DRAM) 760, and flash 765. In addition, one or more example embodiments include one or more communication capabilities, interfaces, and features such as instances of Bluetooth™ 770, a 3G modem 775, a global positioning system (GPS) 780, and an 802.11 Wi-Fi 785.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
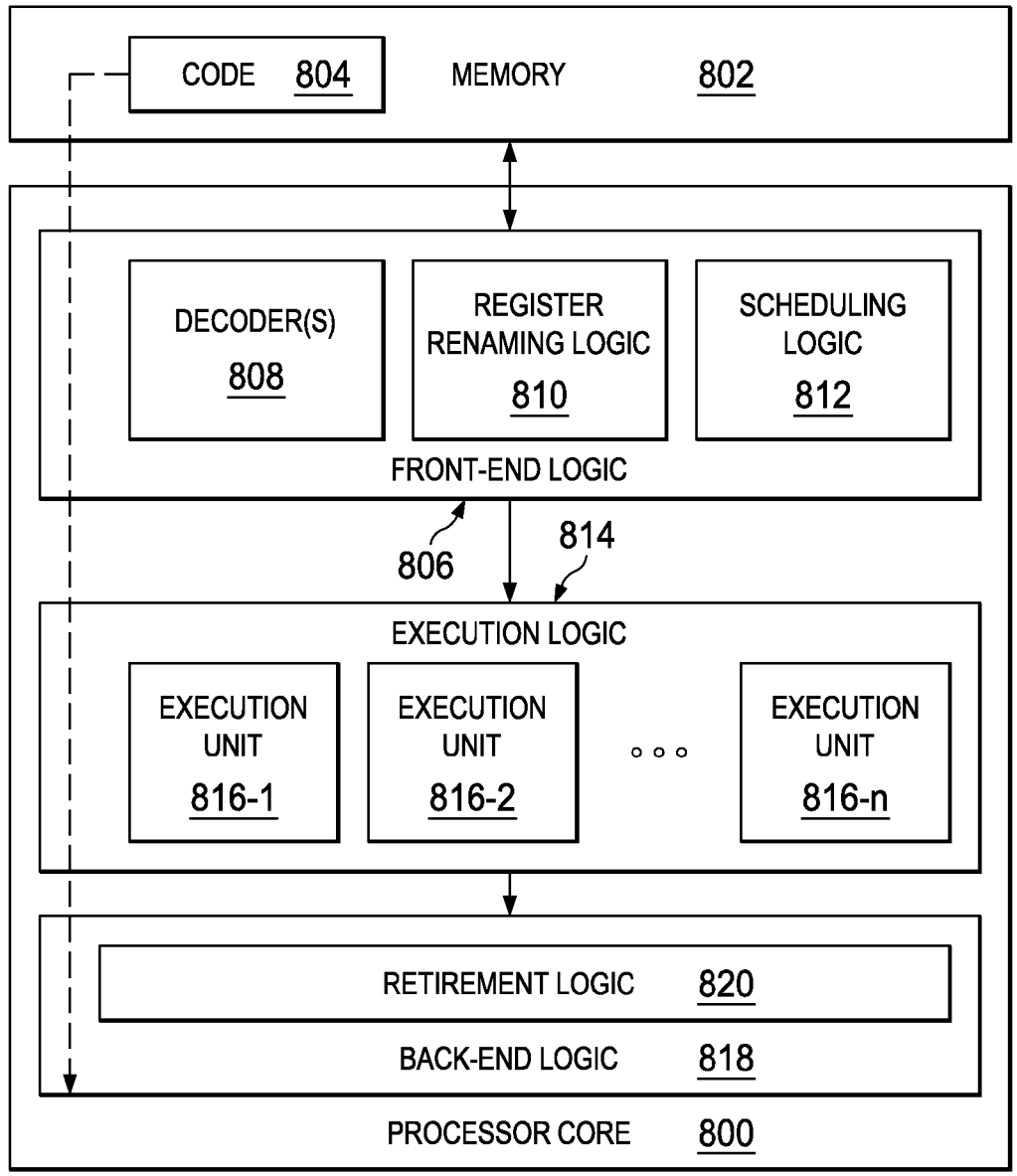
FIG. 8 is a block diagram illustrating an example processor core in accordance with an embodiment.

FIG. 8 illustrates a processor core 800 according to an embodiment. Processor core 800 may be the core for any type of processor, such as a micro-processor, an embedded processor, a digital signal processor (DSP), a network processor, or other device to execute code. Although only one processor core 800 is illustrated in FIG. 8, a processor may alternatively include more than one of the processor core 800 illustrated in FIG. 8. For example, processor core 800 represents one example embodiment of processors cores 674a, 674b, 684a, and 684b shown and described with reference to processors 670 and 680 of FIG. 6. Processor core 800 may be a single-threaded core or, for at least one embodiment, processor core 800 may be multithreaded in that it may include more than one hardware thread context (or "logical processor") per core.

FIG. 8 also illustrates a memory 802 coupled to processor core 800 in accordance with an embodiment. Memory 802 may be any of a wide variety of memories (including various layers of memory hierarchy) as are known or otherwise available to those of skill in the art. Memory 802 may include code 804, which may be one or more instructions, to be executed by processor core 800. Processor core 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor core 800 can also include execution logic 814 having a set of execution units 816-1 through 816-N. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor core 800 allows out of order execution but requires in order retirement of instructions. Retirement logic 820 may take a variety of known forms (e.g., re-order buffers or the like). In this manner, processor core 800 is transformed during execution of code 804, at least in terms of the output generated by the decoder, hardware registers and tables utilized by register renaming logic 810, and any registers (not shown) modified by execution logic 814.

Although not illustrated in FIG. 8, a processor may include other elements on a chip with processor core 800, at least some of which were shown and described herein with reference to FIG. 6. For example, as shown in FIG. 6, a processor may include memory control logic along with processor core 800. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 10 and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations in the preceding flow diagrams (i.e., FIGS. 4-5) illustrate only some of the possible correlating scenarios and patterns that may be executed by, or within, communication system 10. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 10 has been illustrated with reference to particular elements and operations that facilitate the communication process, these elements and operations may be replaced by any suitable architecture, protocols, and/or processes that achieve the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable storage medium having one or more instructions that when executed by at least one processor cause the at least one processor to receive a function call for a function, determine a current stack pointer value for the function call, and determine if the current stack pointer value is within a pre-defined range.

In Example C2, the subject matter of Example C1 can optionally include where the instructions, when executed by the at least one processor, further cause the at least one processor to log a plurality of function calls.

In Example C3, the subject matter of any one of Examples C1-C2 can optionally include where the log of the plurality of function calls is used to rebuild an exploit path and to analyze malware.

In Example C4, the subject matter of any one of Examples C1-C3 can optionally include where the instructions, when executed by the at least one processor, further cause the at least one processor to communicate the log of the plurality of function calls to a security server, wherein the security server uses the log to rebuild an exploit path and to analyze malware.

In Example C5, the subject matter of any one of Examples C1-C4 can optionally include where the function call is an application program interface call.

In Example C6, the subject matter of any one of Example C1-05 can optionally include where the current stack pointer value is determined by reading an ESP register value.

In Example C7, the subject matter of any one of Examples C1-C6 can optionally include where the instructions, when executed by the at least one processor, further cause the at least one processor to block the function call if the current stack pointer value is not within a pre-defined range.

In Example C8, the subject matter of any one of Examples C1-C7 can optionally include where the instructions, when executed by the at least one processor, further cause the at least one processor to allow the function call if the current stack pointer value is within a pre-defined range.

In Example A1, an apparatus can include a security module, wherein the security program interface module is configured to receive a function call for a function, determine a current stack pointer value for the function call, and determine if the current stack pointer value is within a pre-defined range.

In Example, A2, the subject matter of Example A1 can optionally include a stack pivoting logging module to log a plurality of function calls.

In Example A3, the subject matter of any one of Examples A1-A2 can optionally include a stack pivoting detection module to analyze the log of the plurality of function calls to determine, for each of the plurality of function calls, if the current stack pointer value is within a pre-defined range.

In Example A4, the subject matter of any one of Examples A1-A3 can optionally include where the stack pivoting detection module is configured to use the log of the plurality of function calls to rebuild an exploit path and to analyze malware.

In Example A5, the subject matter of any one of Examples A1-A4 can optionally include where the function call is an application program interface call.

In Example A6, the subject matter of any one of Examples A1-A5 can optionally include where the current stack pointer value is determined by reading an ESP register value.

In Example A7, the subject matter of any one of Examples A1-A6 can optionally include where the function call is blocked if the current stack pointer value is not within a pre-defined range.

Example M1 is a method including receiving a function call for a function, determining a current stack pointer value for the function call, and determining if the current stack pointer value is within a pre-defined range.

In Example M2, the subject matter of Example M1 can optionally include logging a plurality of function calls.

In Example M3, the subject matter of any one of the Examples M1-M2 can optionally include analyzing the log of the plurality of function calls to determine, for each of the plurality of function calls, if the current stack pointer value is within a pre-defined range.

In Example M4, the subject matter of any one of the Examples M1-M4 can optionally include communicating the log of the plurality of function calls to a security server, where the security server uses the log to rebuild an exploit path and to analyze malware.

In Example M5, the subject matter of any one of the Examples M1-M5 can optionally include where the function call is an application program interface call.

In Example M6, the subject matter of any one of the Examples M1-M6 can optionally include where the current stack pointer value is determined by reading an ESP register value.

In Example M7, the subject matter of any one of the Examples M1-M7 can optionally include blocking the function call if the current stack pointer value is not within a pre-defined range.

Example S1 is a system for the detection of stack pivoting, the system including a security module configured for receiving a function call for a function, determining a current stack pointer value for the function call, and determining if the current stack pointer value is within a pre-defined range.

In Example S2, the subject matter of Example S1 can optionally include where the security module includes a stack pivoting logging module to log a plurality of function calls, and a stack pivoting detection module to analyze the log of the plurality of function calls to determine, for each of the plurality of function calls, if the current stack pointer value is within a pre-defined range.

Example X1 is a machine-readable storage medium including machine-readable instructions to implement a method or realize an apparatus as in any one of the Examples A1-A7, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory computer-readable medium comprising one or more instructions that, when executed by at least one processor, are configured to:
   detect a plurality of function calls during execution of a program on a computing device;
   log stack status information associated with the plurality of function calls, wherein for each function call of the plurality of function calls, the stack status information comprises a current stack pointer and a valid stack address range;
   analyze the stack status information to determine whether the current stack pointer for each function call is valid;
   determine that the current stack pointer for a particular function call is invalid, wherein for the particular function call, the stack status information indicates that the current stack pointer is outside the valid stack address range;
   determine that the particular function call is associated with an invalid stack pivot and automatically rebuild a control flow associated with the invalid stack pivot based on an analysis of the stack status information; and
   determine whether the control flow associated with the invalid stack pivot is indicative of a return-oriented programming attack.

2. The at least one computer-readable medium of claim 1, wherein the one or more instructions, when executed by the at least one processor, are further configured to:
   communicate the stack status information associated with the plurality of function calls to a security server, wherein the security server uses the stack status information to rebuild the control flow associated with the invalid stack pivot.

3. The at least one computer-readable medium of claim 1, wherein the plurality of function calls comprises an application program interface call.

4. The at least one computer-readable medium of claim 1, wherein the current stack pointer is determined by reading an ESP register value.

5. The at least one computer-readable medium of claim 1, wherein the one or more instructions, when executed by the at least one processor, are further configured to:
   block the particular function call upon determining that the control flow associated with the invalid stack pivot is indicative of a return-oriented programming attack.

6. The at least one computer-readable medium of claim 1, wherein the one or more instructions, when executed by the at least one processor, are further configured to:
   allow the particular function call upon determining that the control flow associated with the invalid stack pivot is not indicative of a return-oriented programming attack.

7. An apparatus comprising:
   a hardware processor to:
   detect a plurality of function calls during execution of a program;
   log stack status information associated with the plurality of function calls, wherein for each function call of the plurality of function calls, the stack status information comprises a current stack pointer and a valid stack address range;
   analyze the stack status information to determine whether the current stack pointer for each function call is valid;
   determine that the current stack pointer for a particular function call is invalid, wherein for the particular function call, the stack status information indicates that the current stack pointer is outside the valid stack address range;
   determine that the particular function call is associated with an invalid stack pivot and automatically rebuild a control flow associated with the invalid stack pivot based on an analysis of the stack status information; and
   determine whether the control flow associated with the invalid stack pivot is indicative of a return-oriented programming attack.

8. The apparatus of claim 7, wherein the hardware processor is further to communicate the stack status information to a security server, wherein the security server uses the stack status information to rebuild the control flow associated with the invalid stack pivot.

9. The apparatus of claim 7, wherein the plurality of function calls comprises an application program interface call.

10. The apparatus of claim 7, wherein the current stack pointer is determined by reading an ESP register value.

11. The apparatus of claim 7, wherein the hardware processor is further to block the particular function call upon determining that the control flow associated with the invalid stack pivot is indicative of a return-oriented programming attack.

12. A method comprising:
    detecting a plurality of function calls during execution of a program on a computing device;
    logging stack status information associated with the plurality of function calls, wherein for each function call of the plurality of function calls, the stack status information comprises a current stack pointer and a valid stack address range;
    analyzing the stack status information to determine whether the current stack pointer for each function call is valid;
    determining that the current stack pointer for a particular function call is invalid, wherein for the particular function call, the stack status information indicates that the current stack pointer is outside the valid stack address range;
    determining that the particular function call is associated with an invalid stack pivot and automatically rebuilding a control flow associated with the invalid stack pivot based on an analysis of the stack status information; and
    determining whether the control flow associated with the invalid stack pivot is indicative of a return-oriented programming attack.

13. The method of claim 12, further comprising:
    communicating the stack status information associated with the plurality of function calls to a security server, wherein the security server uses the stack status information to rebuild the control flow associated with the invalid stack pivot.

14. The method of claim 12, wherein the plurality of function calls comprises an application program interface call.

15. The method of claim 12, wherein the current stack pointer is determined by reading an ESP register value.

16. The method of claim 12, further comprising:
blocking the particular function call upon determining that the control flow associated with the invalid stack pivot is indicative of a return-oriented programming attack.

17. A system for the detection of stack pivoting, the system comprising:
a memory to store stack status information associated with a plurality of function calls of a program; and
a hardware processor to:
detect the plurality of function calls during execution of the program;
log the stack status information associated with the plurality of function calls, wherein for each function call of the plurality of function calls, the stack status information comprises a current stack pointer and a valid stack address range;
analyze the stack status information to determine whether the current stack pointer for each function call is valid;
determine that the current stack pointer for a particular function call is invalid, wherein for the particular function call, the stack status information indicates that the current stack pointer is outside the valid stack address range;
determine that the particular function call is associated with an invalid stack pivot and automatically rebuild a control flow associated with the invalid stack pivot based on an analysis of the stack status information; and
determine whether the control flow associated with the invalid stack pivot is indicative of a return-oriented programming attack.

18. The system of claim 17, further comprising a communication interface to transmit the stack status information to a security server, wherein the security server is to rebuild the control flow associated with the invalid stack pivot based on the analysis of the stack status information.

* * * * *